United States Patent
Neyrou et al.

(10) Patent No.: US 10,244,396 B2
(45) Date of Patent: Mar. 26, 2019

(54) RING-SHAPED IDENTIFICATION DEVICE EQUIPPED WITH A RADIOFREQUENCY TRANSPONDER CONTROLLED BY A LIGHT-SENSITIVE ELEMENT

(71) Applicant: ICARE TECHNOLOGIES, Ajaccio (FR)

(72) Inventors: Jérémy Neyrou, Péri (FR); Fabien Raiola, Porto-Vecchio (FR)

(73) Assignee: ICARE TECHNOLOGIES, Ajaccio (FR)

( * ) Notice: Subject to any disclaimer, the term of this patent is extended or adjusted under 35 U.S.C. 154(b) by 0 days.

(21) Appl. No.: 16/072,879

(22) PCT Filed: Feb. 2, 2017

(86) PCT No.: PCT/EP2017/052265
§ 371 (c)(1),
(2) Date: Jul. 25, 2018

(87) PCT Pub. No.: WO2017/134170
PCT Pub. Date: Aug. 10, 2017

(65) Prior Publication Data
US 2019/0053055 A1     Feb. 14, 2019

(30) Foreign Application Priority Data

Feb. 3, 2016   (FR) ..................... 16 50863

(51) Int. Cl.
*H04W 12/08*     (2009.01)
*H04B 5/00*      (2006.01)
*G06K 19/073*    (2006.01)

(52) U.S. Cl.
CPC ........ *H04W 12/08* (2013.01); *G06K 19/0739* (2013.01); *G06K 19/07345* (2013.01);
(Continued)

(58) Field of Classification Search
CPC ..................................................... H04W 12/08
(Continued)

(56) References Cited

U.S. PATENT DOCUMENTS 3,385,079 A    5/1968  Von Hollen
8,111,160 B2 * 2/2012  Bove ............... G06K 19/07345
                                              340/10.1

(Continued)

FOREIGN PATENT DOCUMENTS

DE    93 20 743 U1    2/1995
KR    101255928 B1    4/2013

(Continued)

*Primary Examiner* — Michael T Vu
(74) *Attorney, Agent, or Firm* — Im IP Law; C. Andrew Im; Chai Im

(57) ABSTRACT

An identification device includes a ring incorporating at least one radiofrequency transponder which includes at least one microcontroller and at least one antenna to emit an electromagnetic field conveying identification data. The identification device further includes an electrical circuit having at least one light-sensitive element. The electrical circuit is mounted electrically between the microcontroller and the antenna such that, when the light-sensitive element receives light, the light-sensitive element acts in a first state as an open switch to electrically isolate the antenna with respect to the microcontroller. When the light-sensitive element is masked, the light-sensitive element acts in a second state as a closed switch, so as to establish an electrical connection between the antenna and the microcontroller in order to permit a current originating from electromagnetic induction of the antenna to flow.

13 Claims, 6 Drawing Sheets

(52) U.S. Cl.
CPC ......... *H04B 5/0031* (2013.01); *H04B 5/0062* (2013.01); *H04B 5/0068* (2013.01)

(58) Field of Classification Search
USPC .............................................. 455/410–414.1
See application file for complete search history.

(56) References Cited

U.S. PATENT DOCUMENTS

| | | | |
|---|---|---|---|
| 8,622,311 B2* | 1/2014 | Hamedani | G06K 19/047 235/492 |
| 2004/0012496 A1 | 1/2004 | De Souza et al. | |
| 2012/0228478 A1 | 9/2012 | Guillaud et al. | |
| 2014/0240088 A1* | 8/2014 | Robinette | G08B 13/1427 340/5.61 |
| 2015/0163677 A1 | 6/2015 | Launay | |
| 2015/0371130 A1* | 12/2015 | Liu | G06K 19/07794 235/375 |

FOREIGN PATENT DOCUMENTS

| | | |
|---|---|---|
| WO | 2009/018286 A1 | 2/2009 |
| WO | 2011/038787 A1 | 4/2011 |

* cited by examiner

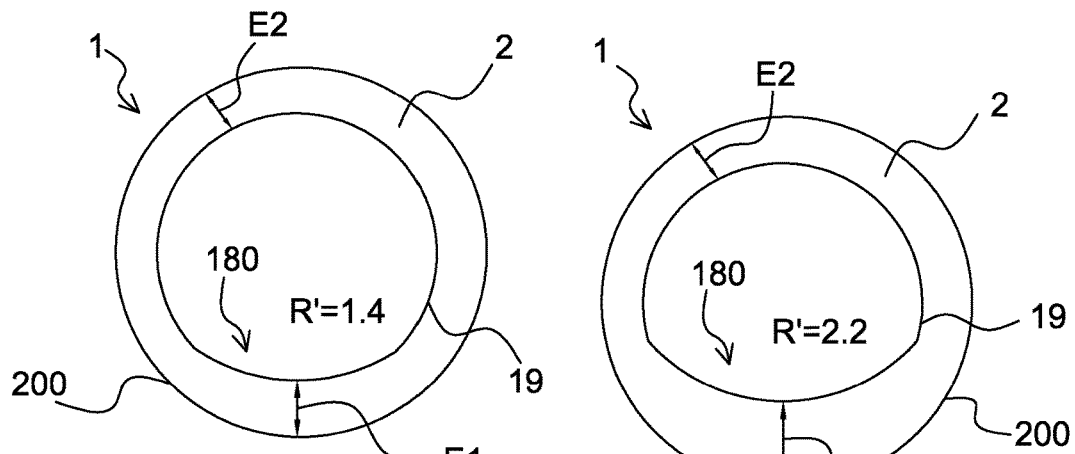
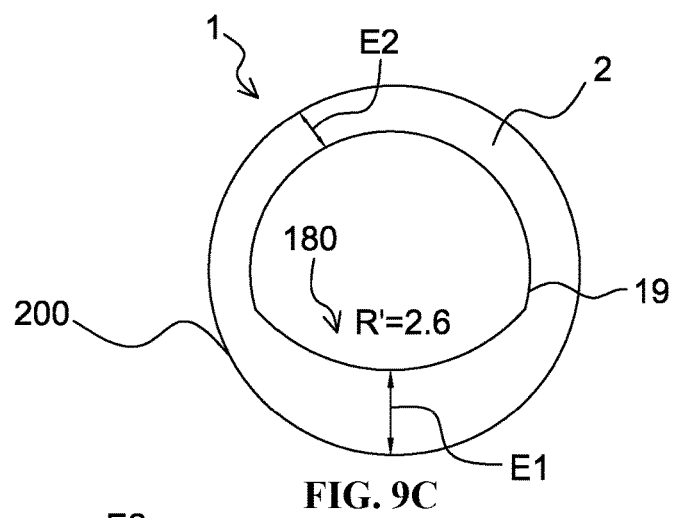
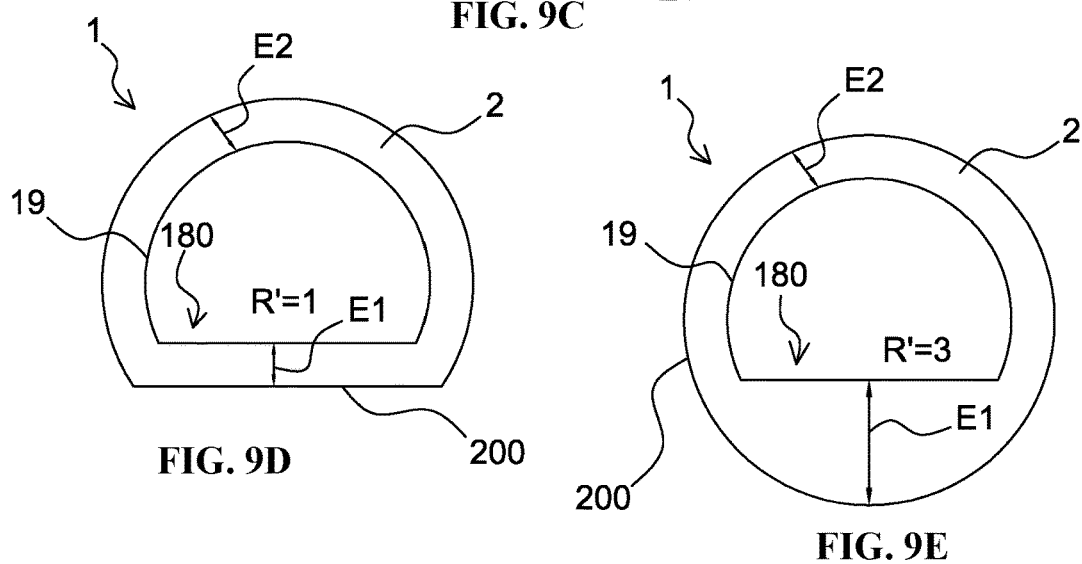

RING-SHAPED IDENTIFICATION DEVICE EQUIPPED WITH A RADIOFREQUENCY TRANSPONDER CONTROLLED BY A LIGHT-SENSITIVE ELEMENT

RELATED APPLICATIONS

This application is a § 371 application from PCT/EP2017/052265 filed Feb. 2, 2017, which claims priority from French Patent Application No. 16 50863 filed Feb. 3, 2016, each of which is incorporated herein by reference in its entirety.

FIELD OF THE INVENTION

The invention relates to an identification device equipped with a radio-frequency transponder, for example of the RFID (or "Radio-Frequency Identification") type and/or the NFC (or "Near Field Communication") type in the shape of a ring.

The invention may be implemented in all areas requiring an identification, or a password, to unlock the operation of a system, to secure access controls such as, but not limited to, automobile, home automation, for example for opening doors, IT, and the field of banking transactions.

BACKGROUND OF THE INVENTION

In the automobile field, developments in automation have enabled to equip vehicles with a starting device by radio-identification. Such a device comprises an active transponder periodically emitting an electromagnetic field to remotely communicate with a corresponding radio reader in the vehicle. For reasons of ease and space requirement, the starting device comprises a housing containing the transponder, a micro-antenna, and a power source. The presence of this power source, generally in the form of a battery, has several disadvantages, particularly related to the discharge and the oxidation of the battery in case of non-sealed boxes.

Furthermore, document KR101255928 proposes a ring-shaped battery-free radio device making it possible to do without a device of the key or housing type. However, this device tends to inadvertently trigger or unlock the associated system without control of the wearer. Indeed, a passive NFC or RFID chip is capable of emitting when an antenna emits electromagnetic waves within range, thereby constituting a lack of security.

OBJECT AND SUMMARY OF THE INVENTION

The invention aims to effectively remedy this drawback by proposing an identification device comprising a ring integrating at least one radio-frequency transponder comprising at least one microcontroller and at least one antenna for emitting electromagnetic field carrying identification data, characterized in that said identification device comprises an electrical circuit comprising at least one photosensitive element, said electrical circuit being electrically connected between said microcontroller and said antenna, so that
when said photosensitive element receives a light, said photosensitive element operates in a first state as an open switch, so as to electrically isolate said antenna from said microcontroller, and
when said photosensitive element is masked, said photosensitive element operates in a second state as a closed switch, so as to establish an electrical connection between said antenna and said microcontroller to cause the circulation of a current due to an electromagnetic induction of said antenna.

The invention thus makes it possible to activate the identification device according to the will of the wearer by masking or not the photosensitive element. This eliminates the risk of inadvertently triggering the system to be controlled by controlling the emission of electromagnetic waves.

In one embodiment, said photosensitive element is positioned on an outer periphery of said ring.

In one embodiment, said electrical circuit further comprises at least one resistor for setting a trigger threshold of the change of state for said photosensitive element and a capacitor for setting a duration before triggering the change of state.

In one embodiment, said device comprises a slot or a hole extending opposite said sensitive element.

In one embodiment, said sensitive element and said antenna form an inscribed angle of the ring, which is comprised between 20 and 340 degrees with respect to a direction normal to a surface of said antenna.

In one embodiment, said slot or hole is covered with a layer or varnish of protection and/or attenuation of light, such as a translucent resin.

In one embodiment, said electrical circuit comprises a light emitting diode adapted to be powered by said photosensitive element when said photosensitive element receives light.

According to one embodiment, said electrical circuit comprises a light emitting diode configured to illuminate when there is an electrical connection between said antenna and said microcontroller.

In one embodiment, the light emitting diode(s) is/are inserted in a light reflector. This optimizes the scattering of light along an edge of the ring.

In one embodiment, said ring comprises at least one anti-rotation means for rotationally locking said ring around a finger of the user.

In one embodiment, data contained in a memory of said microcontroller are encrypted.

According to one embodiment, when said photosensitive member is configured to operate as a closed switch, said photosensitive element is adapted to cause the circulation of a current from a source of electrical energy other than an electromagnetic induction.

BRIEF DESCRIPTION OF THE DRAWINGS

The invention will be better understood from the following description and the annexed figures. These figures are given for illustrative purposes only but in no way as a limitation of the invention.

FIGS. 9A to 9E show embodiments of the identification device according to the invention having different shapes for indexing the rotation of ring around the finger of a user.

DETAILED DESCRIPTION OF THE EMBODIMENTS

Figure 1A:
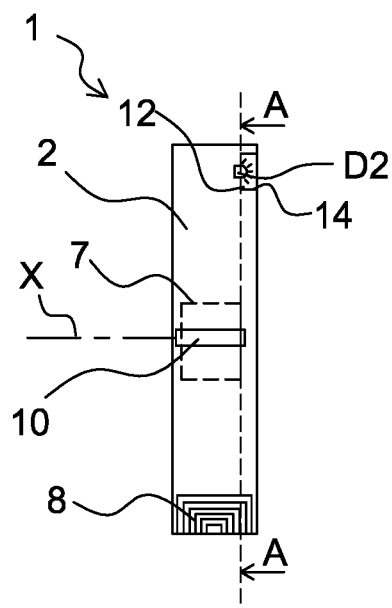
FIGS. 1A and 1B are respectively side and sectional views along the plane A-A of an identification device according to the invention, for right-handed users, equipped with an activation photodiode and diode and provided with a visible light reflector on a single edge of the ring.

Identical, similar or analogous elements have the same reference throughout the figures. In addition, in the following description, relative positioning terms such as "up", "down", "left" and "right" are understood by reference to the meaning given to these terms by a user wearing the ring, the hand being extended with the palm towards the floor of a room.

FIGS. 1A, 1B, 2, 3A, 3B, 4A, 4B show an identification device 1 comprising a ring-shaped body 2 with an axis X incorporating a radio-frequency transponder 3 comprising a microcontroller (or chip 7) and an antenna 8 capable of emitting an electromagnetic field carrying identification data for communicating with a corresponding radio reader 15. The transponder 3 is for example of the NFC or RFID type or can be any other autonomous remote communication transponder without any integrated power supply. Alternatively, several transponders 3 of identical or different technologies can be integrated into the annular body 2 so as to be identified by different types of radio readers 15. For example, an NFC-type and RFID-type transponder can be integrated in the ring 2.

The device 1 can be tightly sealed (or not), impermeable (or not), insensitive to granules, dust (or not) or any other substance/material that can generate an electromagnetic mask, or a deterioration of the assembly.

The identification device 1 comprises an electrical circuit 9 incorporating a photosensitive element D0. Preferably, the photosensitive element D0 is a photodiode. As a variant, the photosensitive element D0 consists of a phototransistor, a photoresistor, a photosensitive, photovoltaic cell, or more generally any optoelectronic component adapted to the application.

Figure 6:
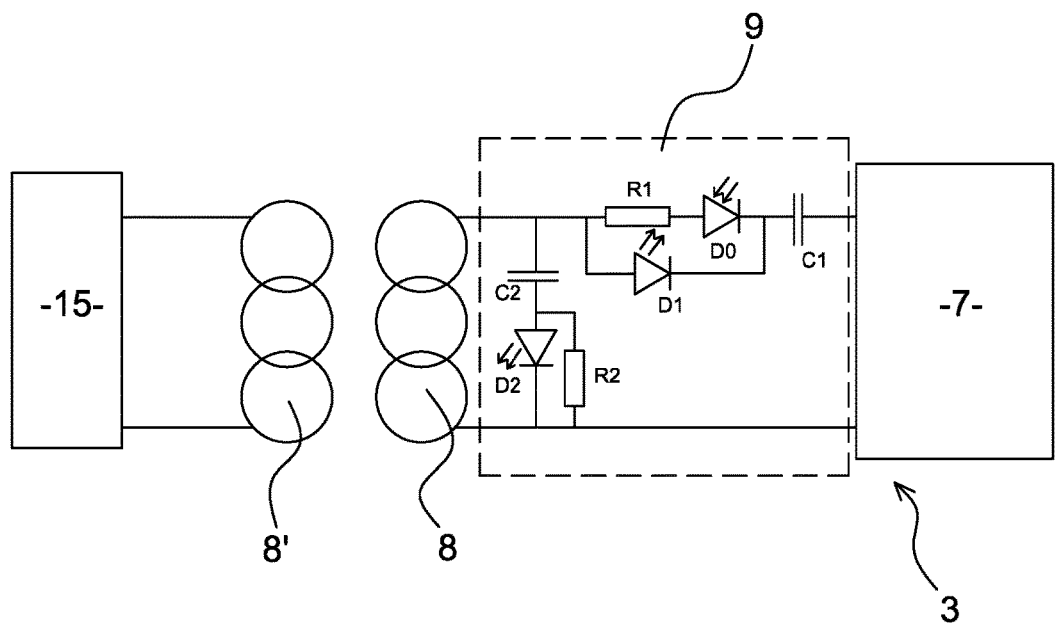
FIG. 6 is a simplified electrical representation of the identification device according to the present invention and of the corresponding reader.

As can be seen in FIG. 6, the electrical circuit 9 electrically connected between the microcontroller 7 and the antenna 8 preferably comprises a resistor R1 for setting a triggering threshold for the change of state of the photosensitive element D0 and a capacitor C1 for setting the time before triggering the change of state. The reaction time of the system is preferably comprised between 1 and 3 milliseconds.

The photodiode D0 is positioned on an outer periphery of the ring 2. The photodiode D0 is provided to be non-completely masked by a finger by a finger, a thumb, or a hand. The photodiode D0 is configured to be sensitive to solar radiation as well as to a large variety of artificial light radiation. Preferably, the photodiode D0 has a maximum spectral sensitivity around the wavelength of 580 nm and a wider sensitivity spectrum than that of the human eye.

Figure 1B:
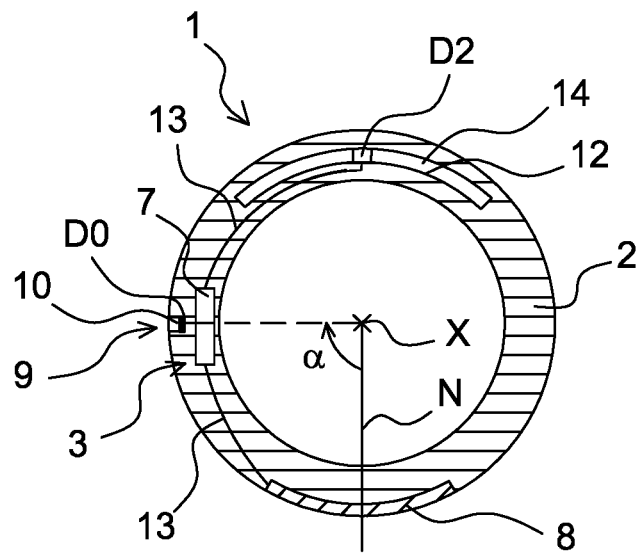
Figures 3A, 3B:
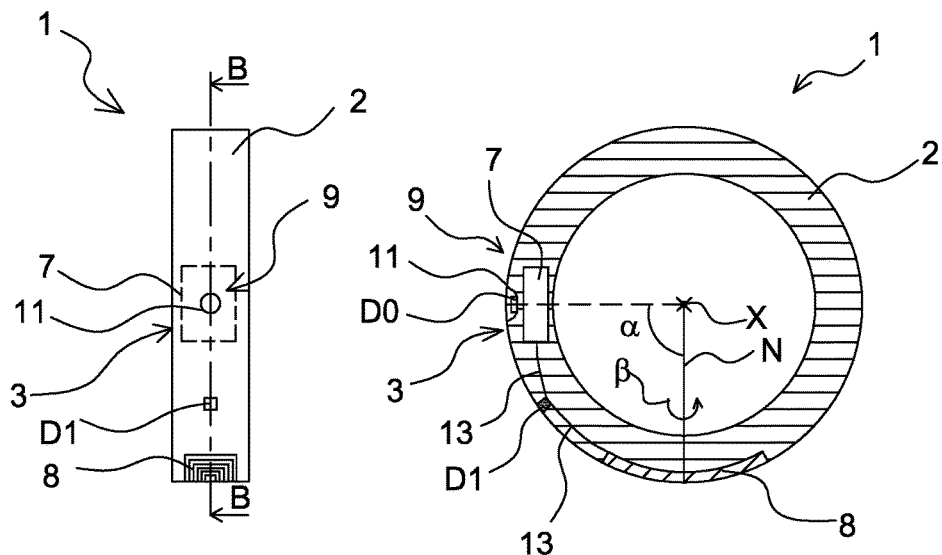
FIGS. 3A and 3B are respectively side and sectional views along a plane B-B illustrating a first embodiment, for ambidextrous users, of the identification device according to the invention.

In the preferred embodiment of FIGS. 1A and 1B, an elongated slot 10 of a few millimeters in length extends opposite the photodiode 10. The slot 10 is formed through the thickness of the outer face of the ring 2 and longitudinally extends along a width of the ring 2. Alternatively, the slot 10 can be replaced with a bore 11, as shown in FIGS. 3A and 3B.

The slot 10 or bore 11 can be covered with a layer or varnish of protection and/or attenuation of the light, such as a translucent resin. The sensitive element D0 and the antenna 8 form an inscribed angle $\alpha$ of the ring 2 between 20 and 340 degrees with respect to a direction N normal to the surface of the antenna 8. The angle $\alpha$ is preferably of 90 degrees (see FIGS. 1B and 2).

In operation, when the photodiode D0 receives a light, the photodiode D0 operates in a first state as an open switch, so as to electrically isolate the antenna 8 from the microcontroller 7. The energy generated by the electromagnetic induction cannot then be transmitted so as to supply the microcontroller 7. The identification device 1 is then in a deactivated state. On the other hand, when the photodiode D0 is masked by a part of the hand, the photodiode D0 operates in a second state as a closed switch, so as to establish an electrical connection between the antenna 8 and the microcontroller 7 to cause the circulation of an electrical current due to electromagnetic induction of the antenna 8. The identification device 1 is then in an activated state so that, when a person approaches the device 1 of an antenna 8 generating an electromagnetic field, then an electromagnetic induction occurs in the antenna 8 and generates a current in the transponder 3, which can then emit an electromagnetic field via the antenna 8. The photodiode D0 may be indirectly the cause of the activation of the device 1. For example, when the photodiode D0 is illuminated, it allows the delivery of a current from another source on the device 1, for example other photovoltaic cells on the outer periphery of the ring 2.

Figure 5:
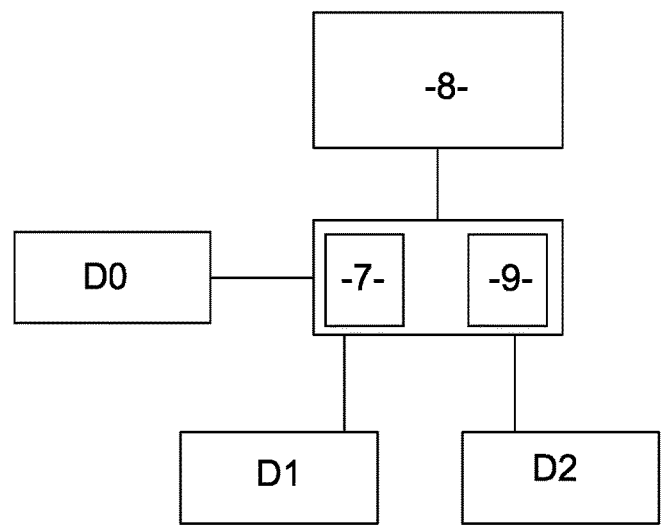
FIG. 5 is a functional representation of the identification device according to the present invention incorporating two state-indication LEDs.

The photodiode D0 used to detect the presence or absence of light on the periphery of the ring 2 can generate a low reverse current when the photodiode D0 receives light. This current can be used to power a light emitting diode D1 (see FIGS. 3A, 3B and 5), so-called state-indication diode, for indicating to the user that the device 1 is deactivated and thus for increasing the intuitiveness of use. It will be possible to also provide a slot or hole above the diode D1 filled with translucent resin if need be.

In the embodiment of FIGS. 1A and 1B, a light emitting diode D2 can be inserted in place of, or in addition to, the diode D1 into the thickness of the ring 2. This state indicating diode D2 connected between the microcontroller 7 and the antenna 8 lights up when the electromagnetic induction occurs.

For this purpose, as can be seen in FIG. 6, a passive high pass type RC filter formed by the resistor R2 and the capacitor C2 is integrated so as to allow the illumination of the diode D2 only when the circuit receives high frequencies due to the electromagnetic induction of the antenna 8. This allows the illumination of the diode D2 only when the device 1 is activated. According to another arrangement, the diode D2 can also flash when the photodiode D0 is masked (that is to say that the microcontroller 7 is communicating).

Figure 2:
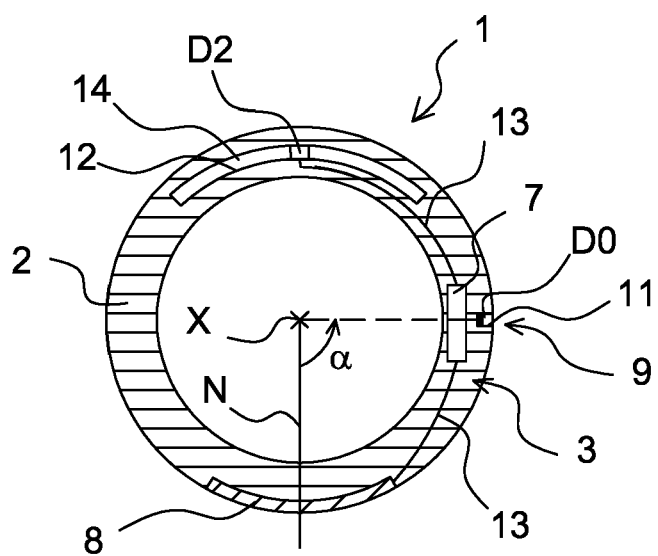
FIG. 2 is a schematic sectional view of an identification device according to the invention, for left-handed users, equipped with an activation photodiode and diode and provided with a visible light reflector on one edge the ring.

As shown in FIGS. 1A, 1B and 2, the diode D2 can be inserted into a light reflector 12. The reflector 12 can be made of a transparent, homogeneous, and isotropic material, thus enabling the spread of light over a wider area than the diode as such.

The microcontroller 7 is electrically connected to the antenna 8 and the light emitting diode D2 via a wired link 13 or via a printed circuit board PCB, flexible or not.

FIGS. 1A and 1B illustrate the positioning of the diode D2 and the reflector 12 associated inside a blind recess 14 opening onto the side of a single axial end face of the ring 2 facing the user when she/he carries the ring 2. Regarding the configuration of the ring 2 for a right-handed user (see FIGS. 1A and 1B), the photodiode D0 is positioned so as to form substantially an angle α of about 90 degrees relative to the normal N to the antenna 8 in the lower part. Seen from the wearer of the ring 2, the angle α is oriented towards the left, so that the user can close the photodiode D0 with her/his thumb in order to activate the device 1, the ring 2 being then worn on the user's forefinger.

In order to switch from the right-handed configuration to the left-handed configuration, it is sufficient to open the recess 14 on the side of the opposite axial end face or to orient the photodiode D0 and the microcontroller 7 by an angle α oriented towards the right with respect to the normal N to the antenna 8, as shown in FIG. 2.

In the ambidextrous embodiment in FIGS. 3A and 3B, only the diode D1 is provided at an angular position between the antenna 8 and the photodiode D0 substantially forming an angle of 90 degrees with the normal N to the antenna 8. To change from the represented right-handed configuration to a left-handed configuration, it is then sufficient to rotate the ring by an angle β of 180 degrees around the normal N. Alternatively, the diode D1 is replaced with the diode D2.

Figures 4A, 4B:
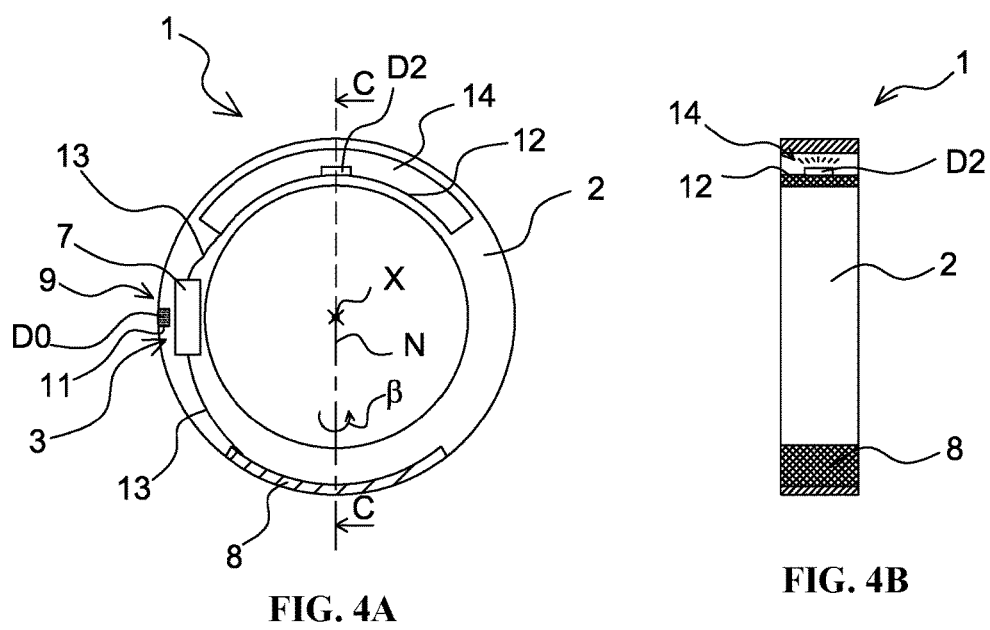
FIGS. 4A and 4B are respectively front and sectional views along a plane C-C illustrating a second embodiment, for ambidextrous users, of the identification device according to the invention.

In the ambidextrous embodiment in FIGS. 4A and 4B, a recess 14 is provided which opens on both sides of the axial end faces of the ring 2. The signal emitted y the diode D2 will thus be visible to the user whatever the orientation of the photodiode D0, that is to say towards the left (as in FIG. 4A) or towards the right after a rotation around the normal N by the angle β of 180 degrees.

If both diodes D1 and D2 are integrated into the ring 2, they allow the user to have a deactivation state indicator with the diode D1 and an activation state indicator with the diode D2. The two diodes D1, D2 will preferably have two different colors, for example a red color for the diode D1 and a green color for the diode D2.

The antenna 8 can be integrated in different ways into the ring 2. Thus, the antenna 8 can be fixed to the surface, for example by gluing, molded in the ring 2, in a semi-apparent, or fully apparent manner.

Furthermore, the microcontroller 7 can be integrated in different ways into the ring 2. In this way, the microcontroller 7 can be fixed to the surface, for example by gluing, molded in the ring 2, in a non-apparent, semi-apparent or fully apparent manner.

For a better security, the data contained in the memory of the microcontroller 7 can be encrypted by using, for example, a symmetric encryption algorithm of the AES ("Advanced Encryption Standard") 256 Bits type. The ring 2 can also be provided with a user authentication device of the biometric reader type.

According to particular embodiments, some or all of the data can also be made unusable or encrypted (any mathematical operation being possible) during the detection of light by a photovoltaic cell integrated into the inner periphery of the ring 2. The (very fast) reuse/decryption of these data can be performed by masking of the photosensitive cell.

In the embodiments in FIGS. 9A to 9E, the ring 2 comprises an anti-rotation means 180 for locking the rotation of the ring 2 around a finger of the user. This enables to index the rotation of the photodiode D0 so as to ensure that it is always in the same position around the finger wearing the ring 2 so that the user can reproduce the same movement in order to mask the photodiode D0 and to activate the identification device 1. For example, if the ring 2 is worn on the forefinger, the anti-rotation means 180 enables the user to use her/his thumb, which can come into contact with the photodiode D0 on the face of the forefinger opposite said thumb. This also enables to index the rotation of the ring 2 around the finger so as to ensure a positioning of the antenna 8 on the inside of the hand when the latter is closed.

In FIGS. 9A to 9C, the anti-rotation means 180 is in this case constituted by an ovoid shape in the inner face 19 of the ring 2 and on the side of the antenna 8. The center of the oval shape is for example coincident with the center of the ring 2. The ratio R' between the largest thickness E1 of a ring portion including the ovoid shape and the base thickness E2 of the ring 2, i.e. the thickness of a ring portion without the ovoid shape is variable and comprised for example between 1 and 5, preferably between 1 and 3. The ratio R' can thus be for example 1.4 (see FIG. 9A), 2.2 (see FIG. 9B), or 2.6 (see FIG. 9C).

Alternatively, the ovoid shape may be replaced with a flat shape in the inner face 19 and in the outer face 200 (see FIG. 9D), or only in the inner face 19 (see FIG. 9E). The ratio R' can also be variable and may be for example 1 (FIG. 9D) or 3 (FIG. 9E). Alternatively, a flat or ovoid shape can be provided on two diametrically opposite sides of the ring 2. The specific shape of the ring 2 for correctly indexing the antenna 8 could be protected independently of the previously-described data erasure system.

Figure 7:
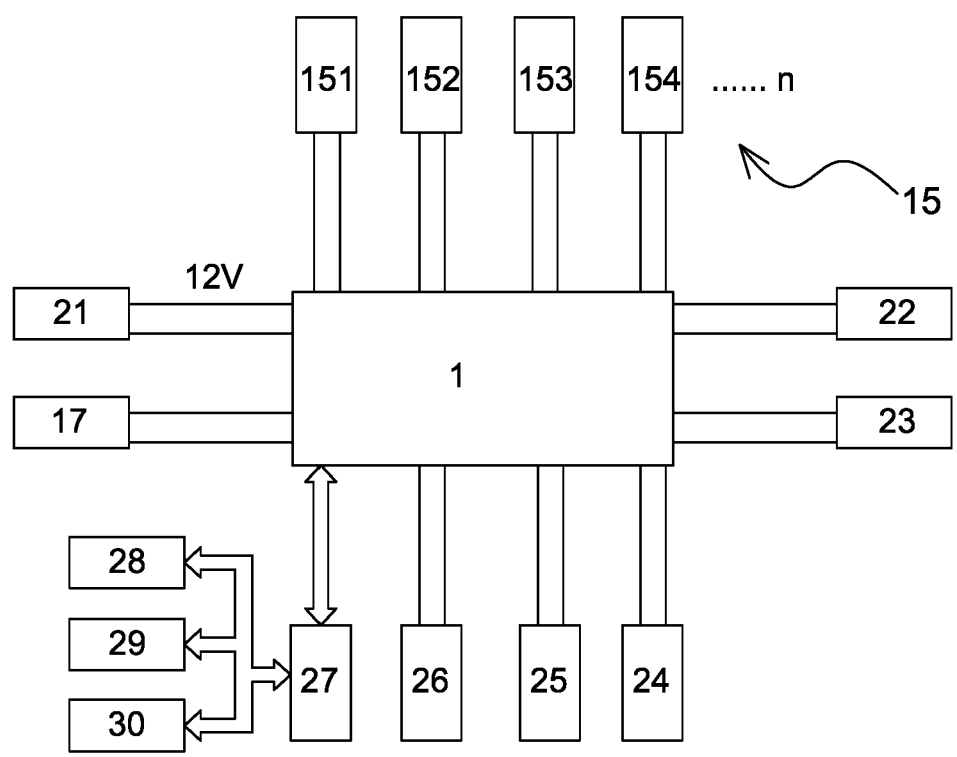
FIG. 7 is a block diagram of the different interactions of the identification device according to the present invention with elements of its environment in the context of an automobile application.
Figure 8A:
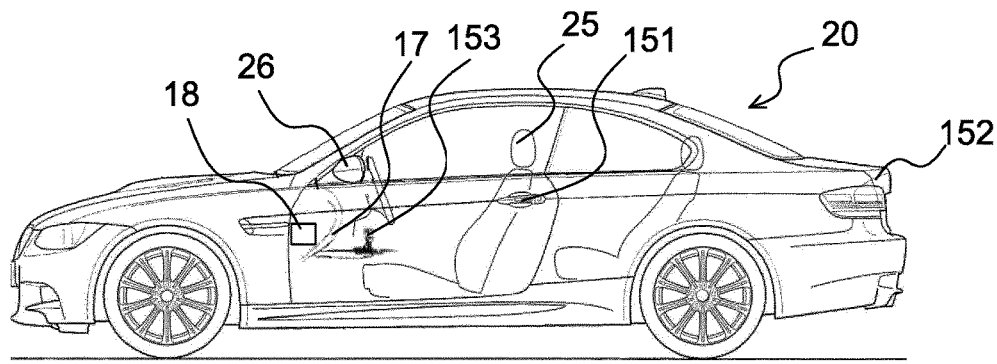
FIGS. 8A to 8D are respectively side, top, back and front views of a vehicle equipped with a radio reader for interacting with the identification device according to the present invention.
Figure 8B:
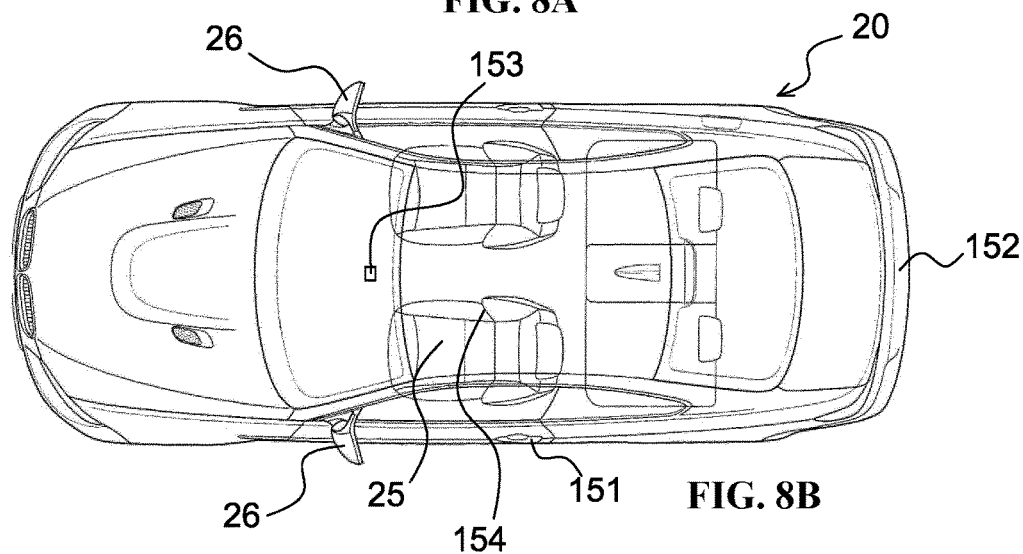
Figure 8C:
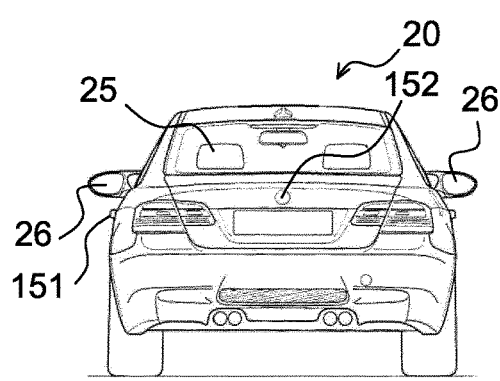
Figure 8D:
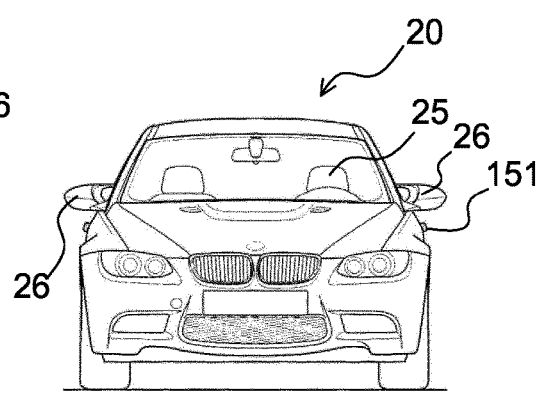

In the case of an automobile application, the transponder 3 can communicate for example with N directional radio readers 15 (N being an integer greater than or equal to 1) in a vehicle 20 (see FIG. 7). This communication is intended to allow an access to rights and/or services to a wearer of the identification device 1.

To this end, each radio-frequency reader 15 comprises a receiving antenna for transponder 3. This antenna is preferably in the form of a rectangular coil associated with a capacitor in order to form a resonant antenna. Such an antenna concentrates its energy in certain directions and is designed to optimally operate at a certain resonance frequency and for a precise adaptation resistance. To make this antenna less sensitive to surrounding metal elements, its resonance frequency and its adaptation resistance have been adapted.

In an exemplary embodiment, a coil of about 3 mH having an adaptation resistance of about 250 to 500 ohms offers the radio reader 15 a signal of optimum quality. The resonance frequency is not necessarily set to the frequency of the electromagnetic field emitted by the transponder 3. Indeed, a better reception of the electromagnetic field is obtained when the resonance frequency of the antenna of the radio reader 15 is greater than 5 to 20% with respect to the frequency of the electromagnetic field. The power supply of the radio reader 15 is provided by a battery 21 in the vehicle 20, which generally delivers a voltage of 12 volts.

This type of radio reader 15 is placed so as to optimize the reading of the electromagnetic field emitted by the transponder 3. As an example, visible in FIGS. 8A to 8D, four radio readers 15 (N=4), each controlling a different function, are installed in a vehicle 20. The radio players 15 have been integrated in this case into a door handle 151, in a trunk handle 152, in a gearshift knob 153, and near a seat belt buckle 154. For a motorcycle, the radio players 15 can be integrated on the fuel tank or in the acceleration handle. It will be noted in this case that the electromagnetic field is slightly attenuated by a glove-type textile interposed between the transponder 3 and the radio reader 15. The radio readers 15 are in the form of a solenoid having about 400 turns with an inductance of about 3 mH. The shape, their adaptation resistance, their resonance frequency, and the number N of radio readers 15, are not limited.

Thus, when the wearer grasps the handle of a vehicle door 20 in order to open it with his hand carrying the identification device 1 in an activated state, the device 1 undergoes an electromagnetic induction from the radio reader 151 integrated into the handle. The induced current, of about 10 μA and 5 V, is sufficient to power the transponder 3 which returns to the antenna of the radio reader 151 a high security identification code preprogrammed during the manufacturing phase and/or the copy by the communicating device. This identification code is then filtered, demodulated and analyzed by a microcontroller in an electronic circuit 18 near the radio reader 153. The identification device 1 is then recognized, the vehicle 20 is instantly unlocked and an adaptation of the driving system is quickly done, in a time of about 4 to 6 seconds.

In order to better control the communication between the identification device 1 and the radio players 15, a switch 17 controls the powering of the electronic circuit of the vehicle under the control of the housing 18, thereby enabling a radio reader 153 to emit a strong magnetic field.

Preferably, an ignition switch 17 controlling the preheating, starting and stopping of the vehicle engine 20, is associated with a starter radio reader 153 in the gearshift knob. The switch 17 can be placed in the cockpit, within reach of the driver's hand such as on the side of the gearshift knob, near the parking brake, or on the dashboard. Such a switch 17 can be paralleled to the conventional starting system by connecting preheating and starting control wires to relevant actors of the engine or by connecting them to a key switch 23.

Thus, when the driver in the driving position presses the switch 17 for controlling the ignition and when she/he puts her/his hand with the identification device 1 near the starting radio reader 153, the vehicle 20 starts. The vehicle 20 remains in an operating condition until the driver presses again the switch 17. For this purpose, the radio reader 153 for controlling the ignition detects the identification device 1 and when the wearer presses the switch 17, the associated reader 153 switches to an unpowered state. In this state, the reader 153 no longer needs identification to keep the engine running. Pressing on the switch 17 again will stop the engine of the vehicle 20 and at the same time power the radio reader 153. The radio reader 153 will then request the high security identification code of the identification device 1.

The N readers are typically transferred from one powered state to another according to the locking or unlocking state of the vehicle 20, with the exception of radio drive 153 for controlling the ignition and the reader 152 in the trunk handle. Indeed, regardless of the locking or unlocking of the vehicle 20, the reader 152 can actuate cylinders opening the trunk automatically. Of course, each radio player 15 can also be associated with a switch 17.

As shown in FIG. 7, the identification device 1 can operate a central locking and unlocking control 22, a key switch 23, various accessories 24, a driver seat 25, rear-view mirrors 26, and an interface 27 controlling an on-board computer 28, a GPS 29, and a vehicle configuration 30. These different commands are performed through actuators controlling for example the position and orientation of the rear-view mirrors 26, the position, the height, the inclination of the driver seat 25 and the support head thereof, the position of the steering wheel. Via a bus connected to the interface 27 adapted to the communication protocol of the vehicle 20, the device 1 can also operate the display of a on-board computer screen 28, the radio station being heard, the voice of the GPS 29, the height of the suspensions as well as their hardness, the hardness of the power assisted steering, the driving assistance electronic, the driving profile, the power of the vehicle 20 and a possible engine restraining for young drivers. Preferably, the identification device 1 is synchronized with the absolute time clock sent by the GPS.

Thus, when a wearer is authenticated as a driver of a vehicle 20, she/he finds each of the settings, accessories 24, and the driving profile, as he had programmed. Each additional setting that the driver will make during her/his session will be recorded. The invention thus enables one to find the driving position again, exactly as left during the last use, and to retrain the engine for young drivers.

According to the vehicle 20 and the need, the identification device 1 can also be connected to the Internet via a cellular data connection, by WIFI® or BLUETOOTH®, thereby enabling an interaction with the database of the vehicle 20, which contains a number of the characteristics thereof, for example and without limitation: identification profiles, driving system configuration, driving history, driving scheduling, fuel consumption, mileage performed or to be performed, route programmed in the GPS 29, and route really performed.

In addition, several identification devices 1 can be synchronized with the same vehicle 20. The registration of the identification devices 1, the driving system, and the engine configuration is carried out by actuating a specific command of the electronic circuit 18 in interaction with the microcontroller. Thus, each wearer using the vehicle 20 can be identified. The entire driving system, as well as the characteristics of the engine can be adapted, hours of use, as well as history can be recorded. The specific control of the electronic circuit 18 may be in the form of a switch, a keypad code, or a remote access of the Internet type.

The use of such an identification device 1 thus enables a simplified and secure identification. In addition, this device 1, which does not require a battery, is not likely to oxidize. More advantageously, the device 1 enables the wearer to operate her/his identification device 1 if she/he wants to, which avoids any untimely operation without control of the wearer. The radio frequency transponder 3 may alternatively comprise a plurality of microcontrollers 7 and a plurality of antennas 8.

The invention claimed is:
1. An identification device comprising:
a ring integrating at least one radio-frequency transponder, the transponder comprising at least one microcontroller and at least one antenna configured to emit an electromagnetic field carrying an identification data;
an electrical circuit comprising at least one photosensitive element, the electrical circuit being electrically connected between said at least one microcontroller and said at least one antenna, such that:
the photosensitive element operates in a first state as an open switch so as to electrically isolate the antenna from the microcontroller in response to a reception of light by the photosensitive element; and the photosensitive element operates in a second state as a closed switch, so as to establish an electrical connection between the antenna and the microcontroller, to enable a circulation of a current due to an electromagnetic induction of the antenna in response to a masking of the photosensitive element.

2. The identification device according to claim 1, wherein the photosensitive element is positioned on an outer periphery of the ring.

3. The identification device according to claim 1, wherein the electrical circuit further comprises: at least one resistor configured to set a triggering threshold of a state change of the photosensitive element; and a capacitor configured to set a duration before triggering the state change.

4. The identification device according to claim 1, further comprising a slot or hole extending opposite the sensitive element.

5. The identification device according to claim 4, wherein the sensitive element and the antenna form an inscribed angle α of the ring between 20 and 340 degrees with respect to a direction normal to a surface of the antenna.

6. The identification device according to claim 4, wherein the slot or hole is covered with at least one of a layer or varnish of protection and attenuation of light.

7. The identification device according to claim 6, wherein the slot or hole is covered with a translucent resin.

8. The identification device according to claim 1, wherein the electrical circuit comprises at least one light emitting diode configured to be powered by the photosensitive element in response to the reception of light by the photosensitive element.

9. The identification device according to claim 8, wherein said at least one light emitting diode is insertable into a light reflector.

10. The identification device according to claim 1, wherein the electrical circuit comprises a light emitting diode configured to illuminate in response to the electrical connection between the antenna and the microcontroller.

11. The identification device according to claim 1, wherein the ring further comprises at least one anti-rotational element configured to lock a rotation of the ring around a finger of a user.

12. The identification device according to claim 1, wherein the microcontroller comprises a memory configured to store encrypted data.

13. The identification device according to claim 1, wherein the photosensitive element, operating in the second state as the closed switch, is configured to enable the circulation of the current from a source of electrical energy other than the electromagnetic induction.

* * * * *